United States Patent
Li et al.

(10) Patent No.: US 7,320,169 B2
(45) Date of Patent: Jan. 22, 2008

(54) SELF-PINNED GMR STRUCTURE BY ANNEALING

(75) Inventors: Yun-Fei Li, Fremont, CA (US); Hui-Chuan Wang, Pleasanton, CA (US); Tong Zhao, Milpitas, CA (US); Chyu-Jiuh Torng, Pleasanton, CA (US)

(73) Assignee: Headway Technologies, Inc., Milpitas, CA (US)

( * ) Notice: Subject to any disclaimer, the term of this patent is extended or adjusted under 35 U.S.C. 154(b) by 610 days.

(21) Appl. No.: 10/846,406

(22) Filed: May 14, 2004

(65) Prior Publication Data

US 2005/0252576 A1    Nov. 17, 2005

(51) Int. Cl.
G11B 5/31    (2006.01)
G11B 5/39    (2006.01)
G11B 5/147   (2006.01)

(52) U.S. Cl. ............... 29/603.14; 148/103; 148/108
(58) Field of Classification Search ............ None
See application file for complete search history.

(56) References Cited

U.S. PATENT DOCUMENTS

| | | | |
|---|---|---|---|
| 6,219,208 B1 | 4/2001 | Gill | 360/324.1 |
| 6,364,961 B1 * | 4/2002 | Nagasaka et al. | 148/108 |
| 6,581,272 B1 * | 6/2003 | Lin et al. | 29/603.14 |
| 6,655,008 B2 | 12/2003 | Gill | 29/603.14 |
| 6,700,760 B1 * | 3/2004 | Mao | 360/324.2 |
| 6,741,433 B1 * | 5/2004 | Nishioka | 360/324.2 |
| 6,779,248 B2 * | 8/2004 | Dovek et al. | 29/603.08 |
| 6,822,838 B2 * | 11/2004 | Lin et al. | 360/324.2 |
| 6,870,711 B1 * | 3/2005 | Zhao et al. | 428/828 |
| 2001/0004798 A1 | 6/2001 | Gill | 29/603.14 |
| 2003/0179515 A1 | 9/2003 | Pinarbasi | 360/324.11 |
| 2003/0179516 A1 | 9/2003 | Freitag et al. | 360/324.11 |
| 2003/0218903 A1 | 11/2003 | Luo | 365/158 |

* cited by examiner

*Primary Examiner*—John P Sheehan
(74) *Attorney, Agent, or Firm*—Saile Ackerman LLC; Stephen B. Ackerman

(57) ABSTRACT

In a conventional spin valve the shunt resistance of the pinning layer reduces the overall efficiency of the device. This problem has been overcome by using IrMn for the pinning layer at a thickness of about 20 Angstroms or less. For the IrMn to be fully effective it must be subjected to a two-step anneal, first in the presence of a high field (about 10 kOe) for several hours and then in a low field (about 500 Oe) while it cools. The result, in addition to improved pinning, is the ability to do testing at the full film and full wafer levels.

20 Claims, 2 Drawing Sheets

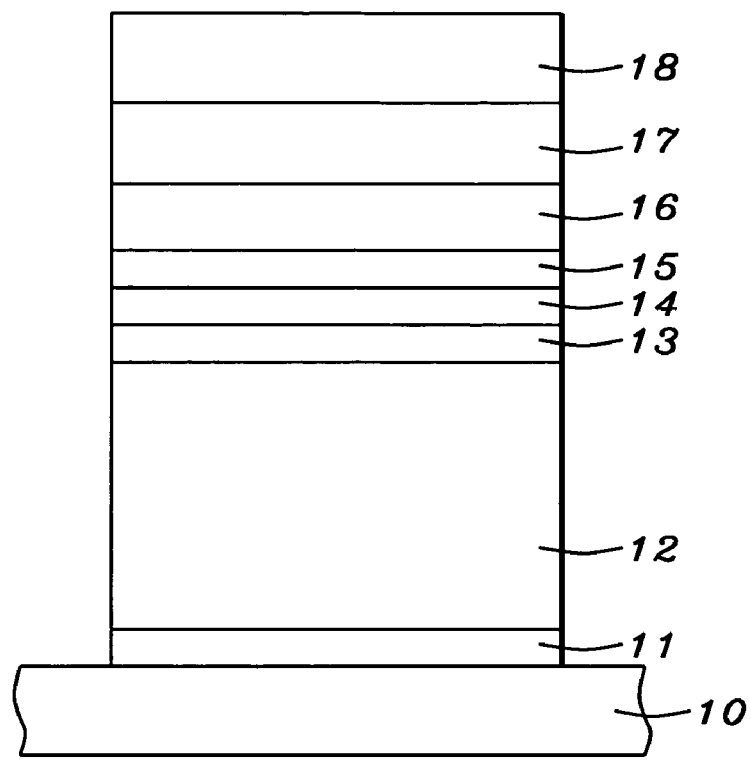
FIG. 1 – Prior Art
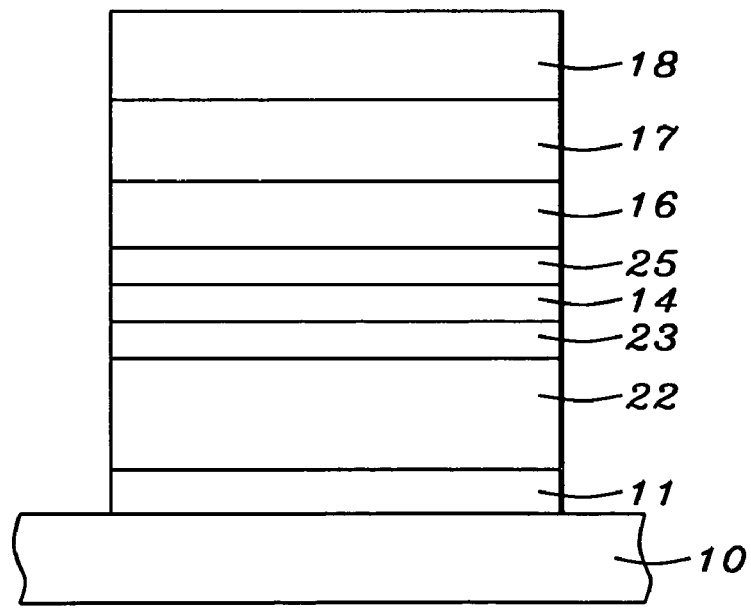
FIG. 2 – Prior Art

SELF-PINNED GMR STRUCTURE BY ANNEALING

FIELD OF THE INVENTION

The invention relates to the general field of GMR spin valves with particular reference to reducing current shunting through improved pinning.

BACKGROUND OF THE INVENTION

The principle governing the operation of most magnetic read heads is the change of resistivity of certain materials in the presence of a magnetic field (magneto-resistance or MR). Magneto-resistance can be significantly increased by means of a structure known as a spin valve where the resistance increase (known as Giant Magneto-Resistance or GMR) derives from the fact that electrons in a magnetized solid are subject to significantly less scattering by the lattice when their own magnetization vectors (due to spin) are parallel (as opposed to anti-parallel) to the direction of magnetization of their environment.

The key elements of a spin valve are illustrated in FIG. 1. They are seed layer 11 on which is antiferromagnetic layer 12 (typically MnPt between about 150 and 200 Å thick) whose purpose is to act as a pinning agent for a magnetically pinned layer. The latter is a synthetic antiferromagnet formed by sandwiching antiferromagnetic coupling layer 14 between two antiparallel ferromagnetic layers 13 (AP2) and 15 (AP1).

Next is a copper spacer layer 16 on which is low coercivity (free) ferromagnetic layer 17. A capping layer 18 usually lies atop free layer 17. When free layer 17 is exposed to an external magnetic field, the direction of its magnetization is free to rotate according to the direction of the external field. After the external field is removed, the magnetization of the free layer will stay at a direction, which is dictated by the minimum energy state, determined by the crystalline and shape anisotropy, current field, coupling field and demagnetization field.

If the direction of the pinned field is parallel to the free layer, electrons passing between the free and pinned layers suffer less scattering. Thus, the resistance in this state is lower. If, however, the magnetization of the pinned layer is anti-parallel to that of the free layer, electrons moving from one layer into the other will suffer more scattering so the resistance of the structure will increase. The change in resistance of a spin valve is typically 8-20%.

Current read head structures are, as shown in FIG. 1, based on the exchange bias pinned synthetic spin valves. It is understood that in order to improve GMR, current shunting reduction and better structure coherence are needed. There are, however, major drawbacks to this structure. Due to the significant reduction of MnPt thickness, there is no Hex, thus no clear magnetic configuration, which makes it impossible to evaluate the GMR behavior on the full film level and/or during wafer process. In addition, the stress-induced anisotropy is around 5,000 e only. Considering stress variations from device to device, this may not be sufficient to avoid pin rotation or pin reversal related head degradation in the drive environment.

To solve this problem, we introduce a modified GMR structure with enhanced He and/or Hex along with a new annealing sequence to promote a clean magnetic configuration in the AP pinned layers, which enables us to measure the GMR behavior at the full film level and during wafer processing. This new annealing sequence. can be readily incorporated into the current standard wafer process sequence. It is suitable, not only for the self-pinned SV structure, but is also applicable to exchange bias based SV.

A routine search of the prior art was performed with the following references of interest being found:

In U.S. Pat. Nos. 6,655,008 and 6,219,208 and in U.S. Patent Application Publication 2001/0004798, Gill shows IrMn as a possible AFM layer (around 200 Å thick) in a self-pinned spin valve. Also shown is a specular reflector layer of Cu, Ag, or Au to overcome loss of conduction electrons. A synthetic AFM is not used. In U.S. Patent Application Publication 2003/0179515, Pinarbasi discloses a self-pinned spin valve where PtMn is preferred as the AFM because IrMn is corrosive.

In U.S. Patent Application Publication 2003/0179516 Freitag et al. use MnPt as the AFM layer while in U.S. Patent Application Publication 2003/0218903, Luo describes a self-pinned spin valve where the AFM is very thin or not deposited at all. IrMn is mentioned as a possible replacement for PtMn.

SUMMARY OF THE INVENTION

It has been an object of at least one embodiment of the present invention to reduce the shunt resistance of the pinning layer in a spin valve.

Another object of at least one embodiment of the present invention has been to provide the ability to test GMR Behavior on the full film level and during wafer processing.

Still another object of at least one embodiment of the present invention has been to provide a clean magnetic configuration at the wafer level throughout wafer processing.

A further object of at least one embodiment of the present invention has been to provide the ability to test GMR behavior at the wafer level These objects have been achieved by using IrMn for the pinning layer at a thickness of about 20 Angstroms or less. For the IrMn to be fully effective it must be subjected to a two-step anneal, first in the presence of a high field (about 10 kOe) for several hours to clean up the magnetic configuration and then switched to a low field (about 500 Oe) before it has cooled so as to retain said clean magnetic configuration.

BRIEF DESCRIPTION OF THE DRAWINGS

FIG. 1 shows a conventional spin valve in which magnetic pinning is achieved through use of a MnPt layer between about 150 and 200 Angstroms thick.

FIG. 2 shows a prior art modification of FIG. 1 wherein making part of the pinned layer highly magnetostrictive allows the thickness of the pinning layer to be reduced.

DESCRIPTION OF THE PREFERRED EMBODIMENTS

Figure 3:
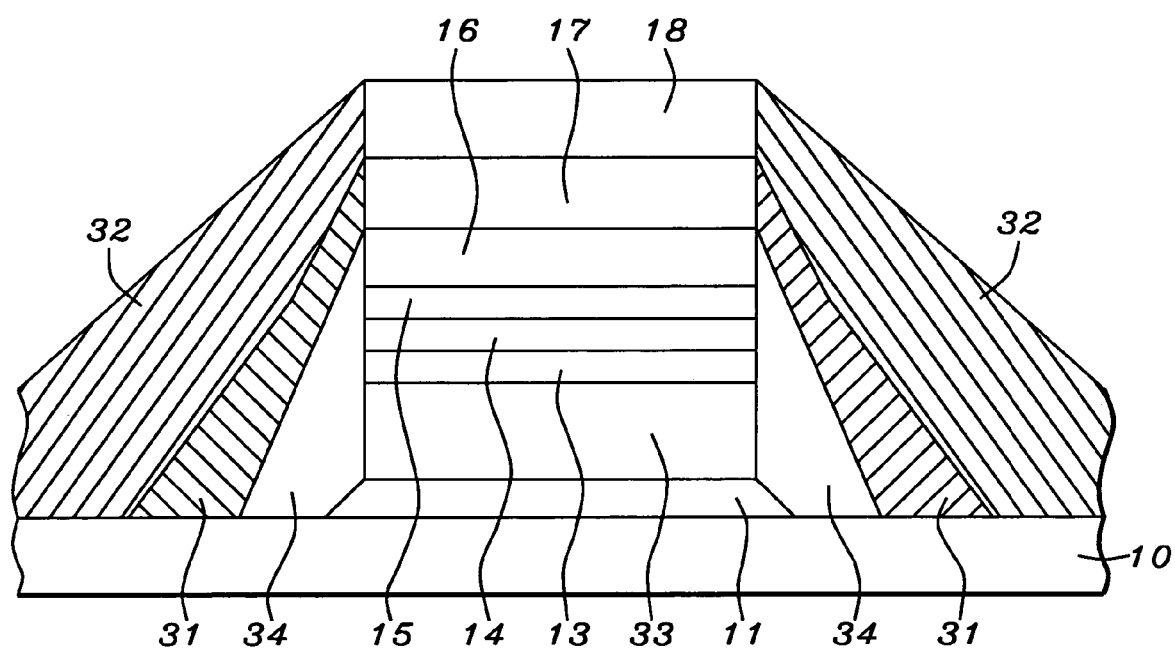
FIG. 3 shows the structure disclosed by the present invention.

As noted earlier, a substantial reduction of the MnPt thickness (layer in FIG. 2) results in inadequate Hex and Hc. To solve this problem, we have introduced a modified GMR structure with enhanced Hc and/or Hex together with a new annealing sequence to promote a clean magnetic configuration in the AP pinned layers. With the resulting structure we can measure the GMR behavior at the full film level and also during wafer processing. 'Full film level' means when all layers of the SV portion of the GMR stack are in place except for the leads and bias electrodes. Our new annealing sequence is readily incorporated into current standard wafer process sequences and is suitable for both Hex or Hc based self-pinned SV structures.

The modified spin valve structure of the present invention utilizes a much thinner IrMn layer as its AFM source. The major difference between IrMn and MnPt is that IrMn is a disordered AFM material, whose critical thickness is just around 20 Å. MnPt, on the other hand, requires extensive annealing to transform it from a disordered fcc to an ordered fct structure. Its critical thickness is close to 100 Å, which is much thicker than for IrMn.

For our modified IrMn SV, we disclose two types of structure, one that is both Hex and Hc based and one that is Hc (magnetostatic) based only. In TABLE I below we show the Hex and Hc characteristics of the two different configurations.

TABLE I

Hex and Hc comparison (after anneal) for different IrMn thicknesses.

| IrMn thickness (Å) | CoFe thickness (Å) | Hex (Oe) | Hc (Oe) |
|---|---|---|---|
| 20 | 13 | 549 | 608 |
| 15 | 13 | 8 | 515 |

Configuration (Å) for Pinning Layer was
NiCr45/IrMn x/CoFe x/Ru50 for Pinned Layer
CoFe25% at In the first structure we used IrMn 20 Å, which still induces enough Hex together with enhanced Hc at room temperature. In the second one, the IrMn thickness has been reduced to 15 Å. This reduction of only 5 Å is sufficient to make it Hc dominated, indicating the importance of very precise control of the IrMn thickness. Here the Hc value is comparable to a stress induced anisotropy field value. Therefore, the anisotropy field is effectively doubled in both cases, making the head more stable in the drive operation.

In FIG. 3 we show a full GMR structure in which the pinning layer is IrMn layer 33 whose thickness will depend on which of the two pinning modes of TABLE I is selected. Annealing of the structure seen in FIG. 3 is performed in two stages as follows:

Stage 1. After GMR SV deposition, on the full film level, the film is annealed for 5 hours at 280° C. in a 10 kOe field to overcome the AP pinning and thus to temporarily align both the AP1 and AP2 magnetizations. This helps to overcome any local energy barriers, which could have been generated as a byproduct of the deposition process. Prior to the onset of cooling, the applied field is reduced to about 500 Oe to reverse the direction of the AP2 magnetization. This comes about naturally because the strong AP coupling between AP1 and AP2 induces perfect antiparallel alignment between AP1 and AP2. The 500 Oe field is maintained throughout the cooling stage in order to maintain the clean magnetic configuration. By a clean configuration we mean one in which the magnetizations of both AP1 and AP2 are well aligned along the directions defined by the AFM pinning and the AP (antiparallel) coupling between AP1 and AP2 without dispersion or complex magnetic domain structures.

Stage 2. Referring once more to FIG. 3, after HB (hard bias) and conductive leads, 31 and 32 respectively, have been formed (partly over dielectric layer 34), a standard lead anneal would normally follow. This step is retained in the process of the present invention in order to avoid pin direction disturbance that such an anneal could introduce if performed under different conditions from those disclosed by the present invention. These are heating at about 250° C. for about 5 hours, while maintaining the 10 kOe field to initially align the AP1 and AP2 magnetizations then switching to 500 Oe before cooling down, just as described immediately above. The field direction stays in the pinning direction.

It is important to note that a key feature of the present invention is the successive application of a high field (10 kOe in this case) and then a low field (500 Oe) which allows the magnetic configuration to be "cleaned up" (in the sense described above) and to then be maintained in said "clean" state during cooling. At elevated temperatures, the AFM induced Hex and Hc can be removed, making it easier to align the net moment of the AP1 and AP2 layers. The field value is carefully selected so as to be high enough to keep the net magnetic moment well aligned but low enough to avoid introducing any relative canting between AP1 and AP2.

Another benefit is that, just as in the standard field anneal, a uniaxial anisotropy in the AP pinned layers can be induced to further enhance a clean magnetic configuration. The GMR data is listed below in TABLE II:

TABLE II

GMR Behavior Comparison for two different IrMn thicknesses after the new anneal sequence

| IrMn thickness | Bs | He | Hc | Hk | Rs | dR/R | dR |
|---|---|---|---|---|---|---|---|
| 20 Angstroms | 0.2511 | 5.83 | 10.74 | 13.08 | 22.83 | 17.46% | 3.99 |
| 70 Angstroms | 0.2512 | 29.14 | 13.32 | 27.29 | 21.57 | 14.52 | 3.13 |

Bs = saturation induction;
He = inter-layer coupling field;
Hk = anisotropy field;
Rs = sheet resistance Thus, when the modified annealing sequence that has been disclosed above is used, an enhanced GMR, close to 30%, is obtained. This is for the full film level, making it suitable to serve as guidance for further development.

Note that this new annealing sequence avoids magnetic dispersion in a self pinned GMR SV structure.

In summary, the advantages offered by the present invention include:
1. Ability to test the GMR Behavior on the full film level and during the wafer process by establishing a clean magnetic configuration in the AP structure.
2. Improved pinning relative to the prior art.
3. A clean magnetic configuration at the wafer level throughout wafer processing.
4. Ability to test the GMR behavior on the wafer level.

The invention claimed is:

1. A method to reduce shunt resistance in a spin valve, comprising:
   including in said spin valve a layer of IrMn for use as a pinning layer;
   annealing said spin valve at between about 100 and 300% C for from about 0.5 to 10 hours in the presence of a magnetic field of from about 6,000 to about 20,000 Oe; and
   then reducing said magnetic field to between about 50 and 2,000 Oe and allowing said spin valve to cool.

2. The method of claim 1 wherein said pinning layer contacts a trilayer of two ferromagnetic layers separated by an antiferromagnetic coupling layer, thereby forming a pinned layer.

3. The method of claim 2 wherein said pinning layer of IrMn is about 20 Angstroms thick, whereby it pins said pinned layer through both exchange and magnetostatic forces.

4. The method of claim 2 wherein said pinning layer of IrMn is about 15 Angstroms thick, whereby it pins said pinned layer through only magnetostatic forces.

5. A process to manufacture a GMR stack, comprising:
on a substrate, depositing a layer of IrMn that is at least 17 Angstroms thick;
depositing a pinned layer on said IrMn layer;
depositing a non-magnetic spacer layer on said pinned layer;
on said spacer layer, depositing a free layer;
performing a first anneal of said deposited layers by heating them at between about 100 and 300% C for between about 0.5 to 10 hours in the presence of a magnetic field of from about 6,000 to about 20,000 Oe then reducing said magnetic field to between about 50 and 2,000 Oe and allowing said deposited layers to cool, thereby forming a spin valve having sidewalls;
selectively depositing a longitudinal hard bias layer on said substrate and on said sidewall;
selectively depositing a conductive lead layer on said longitudinal hard bias layer, thereby forming said GMR stack
performing a second anneal by heating said GMR stack at between about 100 and 300% C for from about 0.5 to 10 hours in the presence of a magnetic field of from about 6,000 to about 20,000 Oe and then reducing said magnetic field to between about 50 and 2,000 Oe and allowing said GMR stack to cool; and
thereby pinning said pinned layer by means of both exchange and magnetostatic fields.

6. The process recited in claim 5 wherein said GMR stack has a GMR ratio of between about 6 and 25%.

7. The process recited in claim 5 wherein said exchange field has a magnitude of at least 20 Oe.

8. The process recited in claim 5 further comprising testing said GMR stack at a full film level.

9. The process recited in claim 5 further comprising testing said GMR stack at a full wafer level during wafer processing.

10. The process recited in claim 5 wherein additional pinning is achieved due to the presence of a stress anisotropy field.

11. The process recited in claim 5 further comprising forming said pinned layer by depositing a layer of antiferromagnetic coupling material between two ferromagnetic layers.

12. The process recited in claim 5 wherein said free layer is selected from the group consisting of NiFe, CoFe, CoNiFe, and CoFeB and is between about 10 and 100 Angstroms thick.

13. A process to manufacture a GMR stack, comprising:
on a substrate, depositing a layer of IrMn that is between about 5 and 16 Angstroms thick;
depositing a pinned layer on said IrMn layer;
depositing a non-magnetic spacer layer on said pinned layer;
on said spacer layer, depositing a free layer;
performing a first anneal of said deposited layers by heating it at between about 100 and 300% C for from about 0.5 to 10 hours in the presence of a magnetic field of from about 6,000 to about 20,000 Oe then reducing said magnetic field to between about 100 and 2,000 Oe and allowing said deposited layers to cool, thereby forming a spin valve having sidewalls;
selectively depositing a longitudinal hard bias layer on said substrate and on said sidewalls;
selectively depositing a conductive lead layer on said longitudinal hard bias layer, thereby forming said GMR stack;
performing a second anneal by heating said GMR stack at between about 100 and 300% C for from about 0.5 to 10 hours in the presence of a magnetic field of from about 6,000 to about 20,000 Oe and then reducing said magnetic field to between about 100 and 6,000 Oe and allowing said GMR stack to cool; and
thereby pinning said pinned layer by means of only a magnetostatic field.

14. The process recited in claim 13 wherein said GMR stack has a GMR ratio of between about 6 and 25%.

15. The process recited in claim 13 wherein said magnetostatic field has a magnitude of at least 300 Oe.

16. The process recited in claim 13 further comprising testing said GMR stack at a full film level.

17. The process recited in claim 13 further comprising testing said GMR stack at a full wafer level during wafer processing.

18. The process recited in claim 13 wherein additional pinning is achieved due to the presence of an anisotropy field.

19. The process recited in claim 13 further comprising forming said pinned layer by depositing a layer of antiferromagnetic coupling material between two ferromagnetic layers.

20. The process recited in claim 13 wherein said free layer is selected from the group consisting of NiFe, CoFe, CoNiFe, and CoFeB and is between about 10 and 100 Angstroms thick.

* * * * *